COOK & DUNCAN.
Harvester Cutter.
No. 112,689.  Patented Mar. 14, 1871.
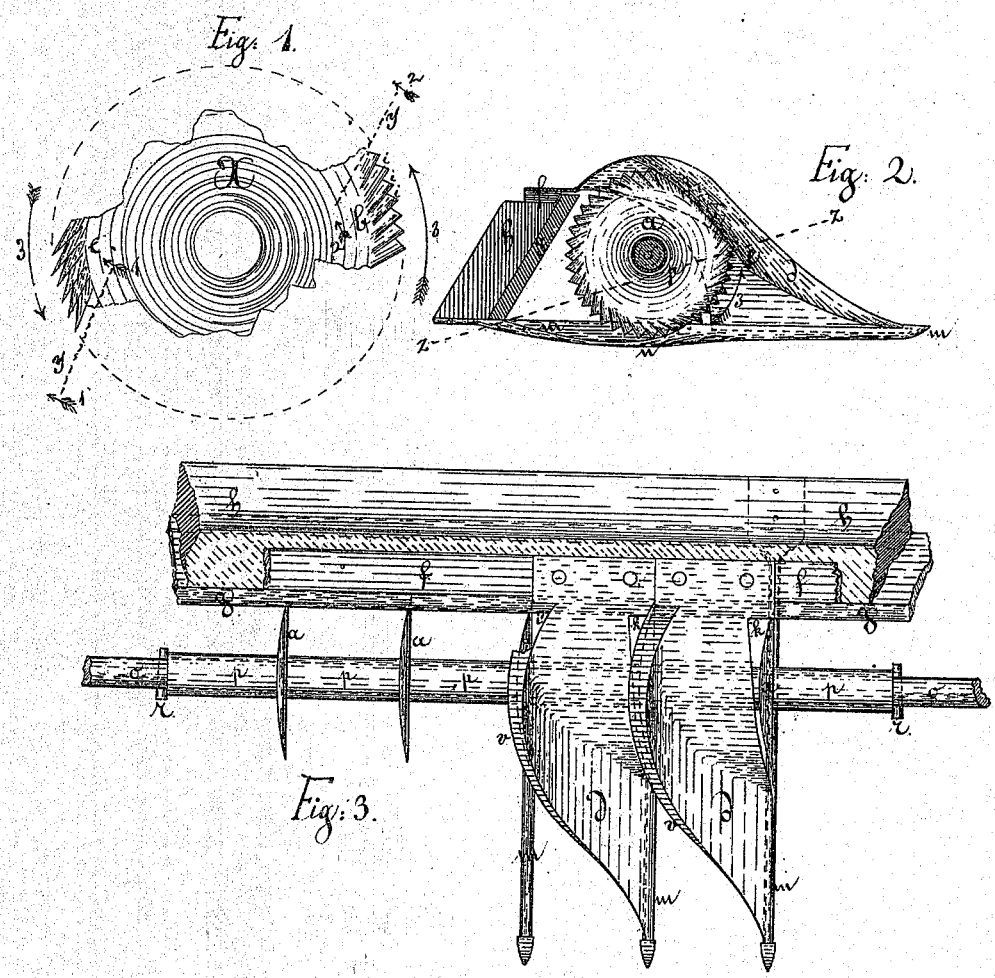

UNITED STATES PATENT OFFICE.

GEORGE W. COOK, OF GENESEO, AND FRANCIS M. DUNCAN, OF ALEDO, ILL.

IMPROVEMENT IN CUTTING APPARATUS FOR HARVESTERS.

Specification forming part of Letters Patent No. 112,689, dated March 14, 1871.

*To all whom it may concern:*

Be it known that we, GEORGE W. COOK, of Geneseo, in the county of Henry and State of Illinois, and FRANCIS M. DUNCAN, of Aledo, in the county of Mercer and State aforesaid, have invented certain Improvements in Rotary Sickles for Mowers, Reapers, and Harvesters; and we do hereby declare the following to be a full, clear, and exact description thereof, sufficient to enable those skilled in the art to which our invention appertains to fully understand and to make and use the same, reference being had to the accompanying drawing, forming part of this specification, and in which—

Figure 1 represents a detached cutter, on which is shown the old method of serrating and our improvement thereon. Fig. 2 is a transverse section of Fig. 3. Fig. 3 is a plan view of a portion of the finger-bars provided with our improvements.

Similar letters of reference indicate like parts in the several figures.

This invention consists, first, in an improved manner of serrating the rotary cutters; secondly, in the peculiar construction of the guards which cover the knives, whereby they not only guide the stalks to the knives, but receive the same after they are cut; thirdly, in the combination, with the guards thus constructed, of slotted fingers arranged in line with the knives; fourthly, in the combination, with peculiarly-constructed guards, of concavo-convex cutters, arranged upon a horizontal shaft; and, finally, in the general construction of an improved cutting mechanism for mowers and reapers, all as and for the purpose hereinafter described and particularly ascertained.

Referring to the drawing, it will be seen that the finger-bar is composed of two parts, $g$ and $h$. It may be made in any of the known forms; but it is inclined as shown in Fig. 2, the upper part being in advance of the bottom, for the purpose of leaving an open space, so as to prevent grass and weeds and the like from clogging the machine by wedging between the knives and finger-bar. This provision is an important feature where the knives revolve upward from the front of the machine, as in our mechanism.

The shaft $o$, which carries the cutters or knives, is mounted in bearings attached to the finger-bar.

The cutters $a$ have a central aperture of the diameter of the shaft, and are arranged thereupon and separated by tubular metallic collars or washers $p$, which are held in place by keys $r$ at the ends, or by means of set-screws at each end of the shaft.

The peculiarity in the serration of the cutters will now be described.

In Fig. 1 is shown a cutter provided on one edge with a series of teeth, $c$, as heretofore ordinarily made, and on the opposite side, at $b$, serrated according to our invention. To make this feature clear, we have made dotted lines $y\, y$, with arrows to show the direction in which the chisel or file is used in forming the teeth as ordinarily made heretofore, as distinguished from that in which it is employed in carrying out our invention.

It should be borne in mind that the revolutions of the cutter are in the direction of the large arrows 3—that is, from the front of the machine toward the finger-bar, as rotary cutters of mowing-machines cannot be used effectively in the opposite direction.

In serrating the cutter, as at $c$, the filing or chiseling is in the direction of the arrows 1 1—that is, in a direction contrary to that in which the cutter must revolve. The effect of this is to form simply blunt hooks, which catch the stalks of grain or grass, and either tear the same off or draw them in between the knife and guard or finger, and thus seriously clog the machine.

In making our cutter the serrations are formed by chiseling or filing in a reverse direction to that just described, as shown by the arrows 2 2—that is, in the same direction with that in which the knife revolves. By this chiseling or filing we form perfect cutting-teeth, having sharp edges at $i\, i$, extending from the base to the point of the tooth; and as these edges are always in advance, (the cutter revolving in the direction of the arrows 3,) they come in contact with the stalks of grass, and instead of tearing and shattering the same, they sever them by a cutting action, while there is no possibility of clogging, the teeth not being in the least degree hook-shaped.

It will be noticed that the lines or angles of the teeth at $b$ are the same as at $c$, but the contrary direction in chiseling; and the formation of a series of angular knife-edges, $i$, produces a marked improvement in the results attained, as has been shown by repeated experiments in the field, in connection with the old-style cutters, in various kinds of grain and grass in different conditions.

We make our knives concavo-convex, and in both right and left hand machines we place the concave side of the knife facing the grain as it inclines toward the knives. The object in making knives of this form will be hereinafter explained.

The guards $d$ are made of cast-iron or other suitable material, and are so shaped and constructed that one side and edge, $v$, acts as a guide to gather and conduct the straws to the knives, and also to prevent the latter from cutting the stalks in more than one place, while the bottom and front edge of the other side gradually inclines around and drops below the shaft to receive the straws after they are cut off.

There is a flange on the front or lower edge of each guard, which rests in a slot made to receive it in the fingers $m$ $m$. These fingers are deeply grooved or slotted throughout their length to receive the flange of the guard and the edge of the cutter, and thus protect it from contact with the ground, an opening from the slot being made at $n$ to prevent clogging.

The guards are riveted to an iron bar, $f$, which is secured to the finger-bar by bolts, that they may be readily removed.

The fingers $m$ are secured in any suitable manner to the finger-bars.

The object in making each guard and finger in separate pieces is for convenience and economy in removing and replacing them if broken, and when it is necessary to sharpen the knives.

At the point $c$ on the guard (in Fig. 2) there is a sudden sloping or inclination upward, which forms a wedging-point between the knife and guard as the straw or grass reaches that point, and is essential to the satisfactory operation of the sickle.

The guards are made narrow at their inner portion, near their points of attachment to the finger-bar, leaving openings, as shown at $i'$ and $k$ in Fig. 3, the object of which is to prevent clogging.

We direct attention particularly to two points in relation to these guards and fingers. The first is, that the fingers are exactly in line with the knives or cutters. The advantage of this is, that a great portion of the straw is allowed to come in straight, while that which is inclined is only in one direction, and is bent or broken in but one place; whereas with the old forms of guards the stalks are all inclined, whereby the grain is crowded down to the earth and prevented from reaching the cutters and broken in two or more places. In our machine the stalks, which are allowed to enter straight without inclination, assist in depositing the remainder in the desired position on the platform. The second point consists in the open spaces which are left between the fingers and the overhanging portions of the guards, so that even when the uncut grain is lying in the direction and at the angle indicated by the line $z$ $z$, Fig. 2, it will not be forced down or obstructed, but caught by the knives and cut.

The peculiar curve of the upper surface of the guard gives a gradual inclination from the surface of the ground to the top of the finger-bar, so that partially-down grain is taken up, cut, carried above the shaft, and delivered upon the platform.

The concavo-convex form of our cutters has been hereinbefore referred to. We will now proceed to describe the object in making them of this form, in connection with the peculiarity of our guides, which has been explained.

The principal object is, that on the concave side there will always be a serrated edge, which will invariably catch the straw, especially that which is straight, as it reaches and passes the point $c$ on the guiding-edge $v$ of the guards, whereas were the knife plane or plano-convex the serrated edge would soon become so rounded that the straw would slip from the edge and be carried down under the machine without being cut. Besides, by this form we obtain a knife having sufficient inflexibility, although made of thin metal; and, in grinding, we readily obtain a good edge by placing the knife with the concave side down on a stone and turning it a few times, while if a plane knife were employed it would necessarily be presented to the stone at an angle, which must give the cutter a rounded edge, and thus prevent it from catching the grain which enters erect.

Having thus described our invention, what we claim as new, and desire to secure by Letters Patent, is—

1. The curved guards $d$, having a gradual upward inclination from the finger to the top of the finger-bar, and constructed with the guiding-surface $v$ and wedging-point $c$, substantially as and for the purpose herein described.

2. In combination with the guards, constructed as specified in the preceding clause, the slotted fingers $m$, having the side opening, $n$, and arranged in line with the cutters $a$, substantially as and for the purpose set forth.

3. A series of concavo-convex serrated knives, $a$, arranged upon a horizontal shaft, in combination with guides constructed substantially as herein described.

4. An improved cutting apparatus for mowers, reapers, and harvesters, composed of a series of concavo-convex cutters, serrated as herein described, and as shown at $b$ in Fig. 1, arranged upon a horizontal shaft, a series of curved guards, $d$, with guiding-surfaces $v$ $c$ and slotted fingers $m$, in line with the knives, all applied to a finger-bar, $g$ $h$, and constructed and operating substantially as herein described.

GEORGE W. COOK.
FRANCIS M. DUNCAN.

Witnesses:
JACOB G. MARTIN,
OLIVER PIERSON.